(12) United States Patent
Sakata et al.

(10) Patent No.: US 12,296,263 B2
(45) Date of Patent: May 13, 2025

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventors: Shinpei Sakata, Tokyo (JP); Gustavo Martins, Tokyo (JP)

(73) Assignee: Square Enix Co., LTD., Tokyo (JP)

( * ) Notice: Subject to any disclaimer, the term of this patent is extended or adjusted under 35 U.S.C. 154(b) by 333 days.

(21) Appl. No.: 17/931,856

(22) Filed: Sep. 13, 2022

(65) Prior Publication Data

US 2023/0084431 A1 Mar. 16, 2023

(30) Foreign Application Priority Data

Sep. 15, 2021 (JP) ................................ 2021-150392

(51) Int. Cl.
 *A63F 13/53* (2014.01)
 *A63F 13/58* (2014.01)
(52) U.S. Cl.
 CPC .............. *A63F 13/53* (2014.09); *A63F 13/58* (2014.09)
(58) Field of Classification Search
 None
 See application file for complete search history.

(56) References Cited

U.S. PATENT DOCUMENTS

| | | | | |
|---|---|---|---|---|
| 6,210,273 | B1* | 4/2001 | Matsuno | A63F 13/45 463/31 |
| 6,409,604 | B1* | 6/2002 | Matsuno | A63F 13/833 463/31 |
| 8,485,899 | B1* | 7/2013 | Rom | A63F 13/26 463/31 |
| 2007/0213107 | A1* | 9/2007 | Itou | A63F 13/56 463/1 |
| 2013/0316835 | A1* | 11/2013 | Takagi | A63F 13/35 463/42 |
| 2014/0106879 | A1* | 4/2014 | Tabata | A63F 13/22 463/31 |

FOREIGN PATENT DOCUMENTS

JP 2018167037 A 11/2018

* cited by examiner

*Primary Examiner* — Jason T Yen
(74) *Attorney, Agent, or Firm* — Stoel Rives LLP

(57) ABSTRACT

A non-transitory computer-readable medium including a video game processing program for causing a server to perform functions to determine an influence area of an object on a character is provided. The functions includes: a registering function configured to register influence area information in advance, a relationship between a plurality of unit areas around an object when a character is connected to the object and a structural model constituting the character being set for each of the unit areas in the influence area information for each combination of the character and the object; and an outputting function configured to output, in a case where a certain combination of a character and an object is specified, influence area information corresponding to the certain combination.

5 Claims, 10 Drawing Sheets

Item A  Item B

COMPARISON
RESULT
Match Area
·27/35
=77.14%

NON-TRANSITORY COMPUTER-READABLE MEDIUM AND VIDEO GAME PROCESSING SYSTEM

CROSS-REFERENCE TO RELATED APPLICATION

This application claims priority to and the benefit of Japanese Patent Application No. 2021-150392 filed on Sep. 15, 2021, the disclosure of which is expressly incorporated herein by reference in its entirety.

BACKGROUND

At least one of embodiments of the present disclosure relates to a process of defining an influence area of an object on a character as a new index indicating a characteristic of the object.

Conventionally, artificial intelligence (AI) has been used to control a character that is not a target of an operation by a player (that is, a non-player character: NPC). In a character control by AI, in a case where a character newly obtains a certain object, AI is required to determine how to use the object. However, it is required that the determination is not unnatural. For example, if the newly obtained object is an object similar to an object that has been used by the character, it is natural that the character can use the newly obtained object in the similar manner. However, if an object that has never been used is suddenly used, it looks unnatural.

Examples of a game system and the like in which a user can easily organized obtained items may be found in Japanese Patent Application Publication No. 2018-167037 (JP2018-167037A). The disclosed game system includes a configuration in which items that define similar relations in advance such as items whose attributes are the same and whose rank differences falls within a certain range and items whose effects (or forces) are the same and whose rank differences falls within a certain range are extracted as similar items.

A mechanism in which, when an NPC newly obtains an object, AI that controls the NPC autonomically considers a method of using the newly obtained object is desirable. Preferably, behavior of the NPC as a control result autonomically considered by AI is objectively natural. For example, in a method in which a method of using an object is defined completely in advance, it is unnatural for an object that has never been used to be suddenly mastered. For this reason, there is a possibility that the unnaturalness can be eliminated by a mechanism of defining a similar relation between objects in advance and applying an accumulated method of using a similar object (or a learned method of using) by analogy.

On the other hand, in recent years, the number of video games, which include online games whose content is updated regularly and consumer type games that are sold as packages in which the content of the game changes from the initial content of when a service started (when the game went on sale) such as addition of the game content by downloading, is increasing. In a case where all similar relations of items are defined as in JP2018-167037A, the workload of updating the game becomes enormous because whether any object such as an item to be added later is similar to any existing object must be defined when the content is added. For that reason, there has been a demand for a new index indicating characteristics of an object, which allows a comparison between a newly obtained object and an object obtained in the past.

SUMMARY

It is an objective of at least one of embodiments of the present disclosure to solve the problem described above, and to provide a non-transitory computer-readable medium including a video game processing program and a video game processing system for realizing a process to determine an influence area of an object on a character as a new index indicating characteristics of the object.

According to one non-limiting aspect of the present disclosure, there is provided a non-transitory computer-readable medium including a video game processing program for causing a server to perform functions to determine an influence area of an object on a character.

The functions include a registering function configured to register influence area information in advance, a relationship between a plurality of unit areas around an object when a character is connected to the object and a structural model constituting the character being set for each of the unit areas in the influence area information for each combination of the character and the object.

The functions also include an outputting function configured to output, in a case where a certain combination of a character and an object is specified, influence area information corresponding to the certain combination.

According to another non-limiting aspect of the present disclosure, there is provided a video game processing system for executing processes to determine an influence area of an object on a character. The video game processing system includes a communication network, a server and a user terminal.

The video game processing system further includes a registerer configured to register influence area information in advance, a relationship between a plurality of unit areas around an object when a character is connected to the object and a structural model constituting the character being set for each of the unit areas in the influence area information for each combination of the character and the object.

The video game processing system also includes an output controller configured to output, in a case where a certain combination of a character and an object is specified, influence area information corresponding to the certain combination.

According to still another non-limiting aspect of the present disclosure, there is provided a non-transitory computer-readable medium including a video game processing program for causing a user terminal to perform functions to determine an influence area of an object on a character.

The functions include a registering function configured to register influence area information in advance, a relationship between a plurality of unit areas around an object when a character is connected to the object and a structural model constituting the character being set for each of the unit areas in the influence area information for each combination of the character and the object.

The functions also include an outputting function configured to output, in a case where a certain combination of a character and an object is specified, influence area information corresponding to the certain combination.

According to each of the embodiments of the present application, one or two or more shortages are solved.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings.

DETAILED DESCRIPTION

Hereinafter, examples of embodiments according to the present disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
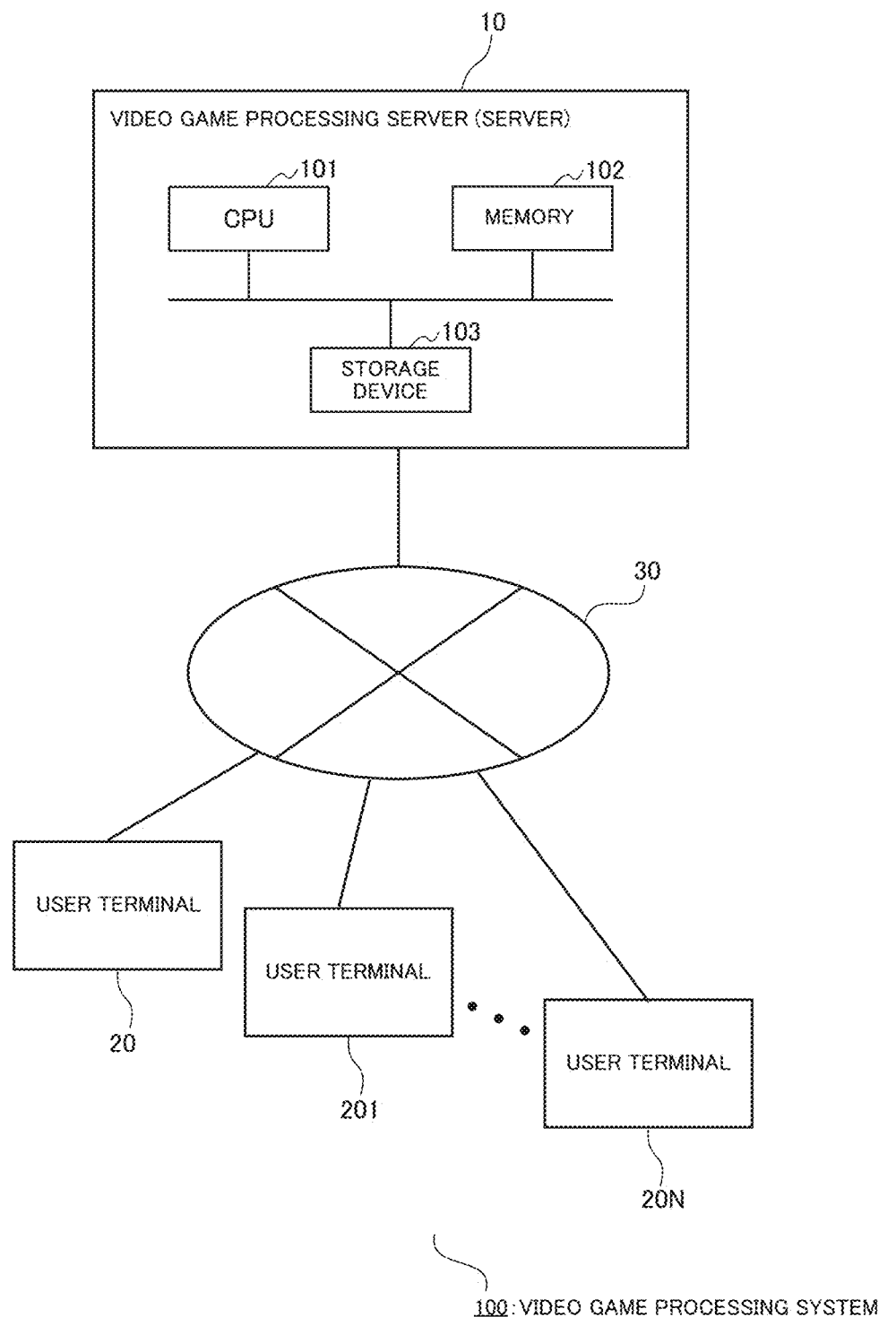
FIG. 1 is a block diagram illustrating an example of a configuration of a video game processing system corresponding to at least one of the embodiments of the present disclosure.

FIG. 1 is a block diagram illustrating an example of a configuration of a video game processing system corresponding to at least one of the embodiments of the present disclosure. As illustrated in FIG. 1, the video game processing system 100 includes a video game processing server 10 (hereinafter, referred to as a "server 10") and user terminals 20, and 201 to 20N ("N" is an arbitrary integer) respectively used by users of the video game processing system 100. In this regard, the configuration of the video game processing system 100 is not limited to this configuration. The video game processing system 100 may be configured so that the plurality of users uses a single user terminal, or may be configured so as to include a plurality of servers.

Each of the server 10 and the plurality of user terminals 20 and 201 to 20N is connected to a communication network 30 such as the Internet. In this regard, although it is not illustrated in the drawings, the plurality of user terminals 20 and 201 to 20N is connected to the communication network 30 by executing data communication with base stations managed by a telecommunication carrier by means of a radio communication line.

The video game processing system 100 includes the server 10 and the plurality of user terminals 20 and 201 to 20N, whereby various kinds of functions for executing various kinds of processing in response to an operation of the user are performed.

The server 10 is managed by an administrator of the video game processing system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a CPU (Central Processing Unit) 101, a memory 102, and a storage device 103.

The CPU 101 is a central processing unit configured to execute various kinds of calculations and controls. Further, in a case where the server 10 includes a GPU (Graphics Processing Unit), a part of the various kinds of calculations and controls may be executed by the GPU. The server 10 appropriately executes, by the CPU 101, various kinds of information processing required to control a video game by using data read out onto the memory 102, and stores obtained processing results in the storage device 103 as needed.

The storage device 103 has a function as a storage medium for storing various kinds of information. A configuration of the storage device 103 is not limited particularly. However, it is preferable that the storage device 103 is configured so as to be capable of storing all of the various kinds of information required to control the video game from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured so as to have a dedicated storage region outside the server 10.

Figure 2:
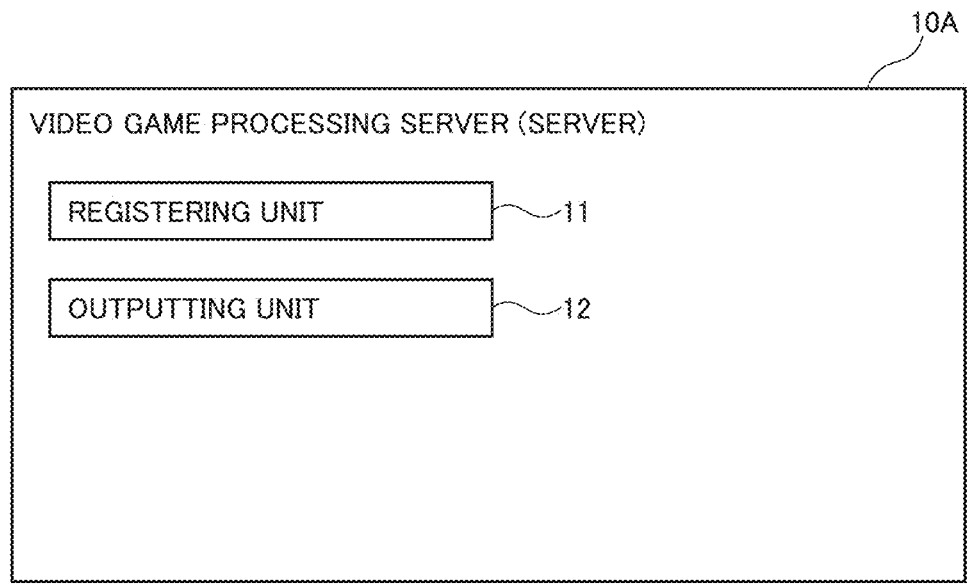
FIG. 2 is a block diagram illustrating a configuration of a video game processing server corresponding to at least one of the embodiments of the present disclosure.

FIG. 2 is a block diagram illustrating a configuration of a video game processing server corresponding to at least one of the embodiments of the present disclosure. The configuration of a video game processing server 10A (hereinafter, referred to as a "server 10A") illustrated in FIG. 2 is an example of the configuration of the server 10. As illustrated in FIG. 2, the server 10A at least illustrates a registering unit 11 and an outputting unit 12.

The registering unit 11 has a function to register influence area information in advance. A relationship between a plurality of unit areas around an object when a character is connected to the object and a structural model constituting the character is set for each of the unit areas in the influence area information for each combination of the character and the object.

Here, the character means something that appears and acts in the video game. The character includes something that acts on the basis of a user operation and something that autonomically acts regardless of a user operation. However, the character according to the present embodiment at least autonomically acts a behavior using an object regardless of a user operation. The character that autonomically acts is not limited particularly. Such a character may be a non-player character (NPC) that does not completely accept an operation of the user in the video game, or may be a character in which a situation to accept some operations of the user exists, but that does not accept any operation of the user in the other situation. As an example of the character that autonomically acts, there is a character that autonomically recognizes surrounding objects, makes decisions, and carries out a behavior. In this regard, the character according to the present embodiment does not necessarily have to be a human, and may be any character so long as it is treated as an intellectual subject.

Further, the object means a virtual object that appears in the video game. In particular, the object according to the present embodiment is an object that is to be used by the character. Further, at least one connection point is set to the object, and is connected to the character and used. Here, the connection means that a character and an object become a connecting state and the object becomes an operable state on the basis of the intention of the character. As examples of the connection, a case where a robot-type character is equipped with a weapon as an object can be considered in addition to an action of the character to grasping by hand.

Further, the unit area means the smallest unit area obtained by dividing a space around an object into predetermined sizes. In a case where a game space is represented in two dimensions, the unit area becomes a plane area with a predetermined size. In a case where the game space is represented in three dimensions, the unit area becomes a voxel with a predetermined size.

Further, the structural model constituting the character means a model that represents a skeletal structure of the character such as a length of a bone and a joint position of the character. Further, it is conceivable that information on a movable range of the joint position is also provided in addition to information on the joint position.

Further, the influence area information means information that represents a relationship between each of a plurality of unit areas around an object and a structural model constituting a character. The entire surrounding space with a size set in advance is divided into a plurality of unit areas, and information indicating a relationship is set to each unit area. The relationship can be set in various ways. For example, it can be considered to set a relationship such as an area where a body of a character can move and an area where the body of the character cannot move. As one example of a method of setting a relationship, a method of setting a parameter, a flag, or the like according to a relationship can be considered. The extent to which influence area information is set around an object can be determined appropriately as the specifications of the video game. Further, any relationship between the character and the object, which is treated as the influence area information, may be used. Further, in a case where there is a plurality of connection points between the character and the object, the influence area information may be registered for each connection point. Since the influence area information is information in which a relationship between a character and an object is registered for each connection point, the structural model thereof also changes if the character changes. Thus, when the relationship changes, the influence area information also differs, and when the object changes, the relationship changes and the influence area information also differs because a shape and the like of the object differs. Namely, the influence area information is registered for each combination of the character, the object, and the connection position thereof.

The outputting unit 12 has a function to output, in a case where a certain combination of a character and an object is specified, influence area information corresponding to the certain combination. In a case where a combination of a character and an object is specified for the outputting unit 12 in a situation where the influence area information is required, the outputting unit 12 refers to the information on the specified combination of the character and the object registered by the registering unit 11, and identifying influence area information to output the identified influence area information. In this regard, in a case where there is a plurality of connection methods for the combination of the character and the object, it goes without saying that the influence area information may be identified by using information for specifying the connection point in addition to the combination of the character and the object.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the video game processing system 100 can include is not limited to the example described above. Each of the user terminals 20, and 201 to 20N may be configured so that the user can recognize the content of the video game. As the other examples of the user terminal, there are one obtained by combining various kinds of communication terminals, a personal computer, and a stationary game apparatus.

Further, each of the plurality of user terminals 20, and 201 to 20N is connected to the communication network 30, and includes hardware (for example, a display device for displaying a browser screen or a game screen based on a coordinate and the like) and software for executing various kinds of processes by communicating with the server 10A. In this regard, each of the plurality of user terminals 20, and 201 to 20N may be configured so as to be able to directly communicate with each other without the server 10A.

Next, an operation of the video game processing system 100 (hereinafter, referred to as the "system 100") according to the present embodiment will be described.

Figure 3:
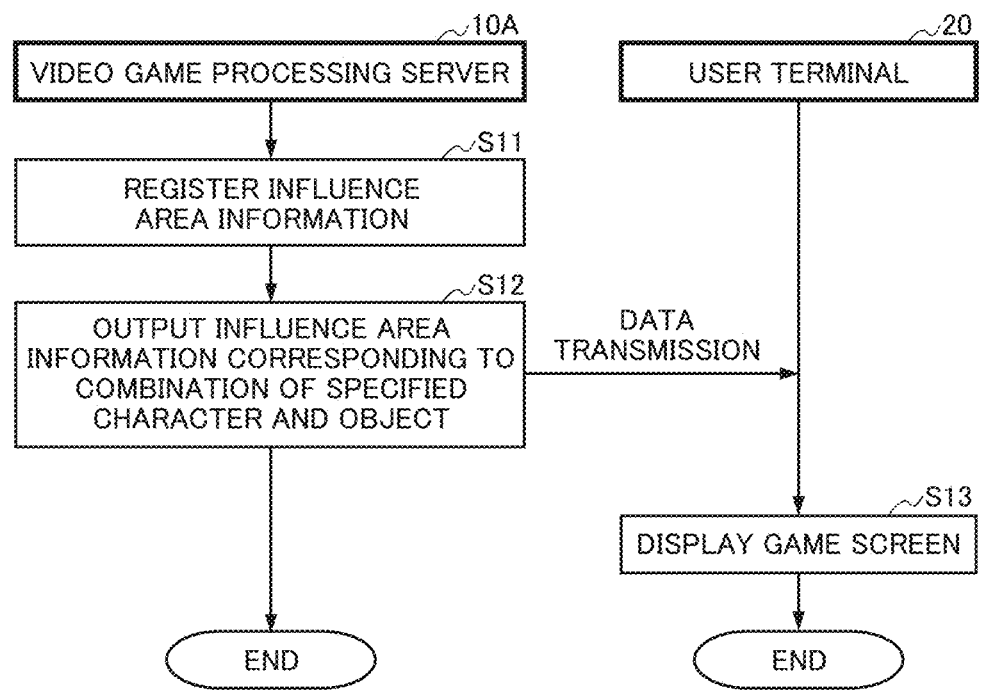
FIG. 3 is a flowchart illustrating an example of game processing corresponding to at least one of the embodiments of the present disclosure.

FIG. 3 is a flowchart illustrating an example of game processing corresponding to at least one of the embodiments of the present disclosure. In the game processing according to the present embodiment, processes related to a control of progress of the video game in response to an operation of the user of the user terminal 20 are executed. Hereinafter, a case where the server 10A and the user terminal 20 execute the game processing will be described as an example.

When the game processing is started, the server 10A first registers influence area information on a combination of a character and an object (Step S11). Then, in a case where the combination of the character and the object is specified, the server 10A outputs corresponding influence area information (Step S12). The server 10A executes data transmission for reflecting an influence of a process based on the influence area information outputted to the user terminal 20. Then, the user terminal 20 receives data for reflecting the influence area information. If necessary, the user terminal 20 causes a predetermined display device to display a game screen to which the process based on the influence area information is reflected (Step S13), and terminates the game processing.

Figure 4:
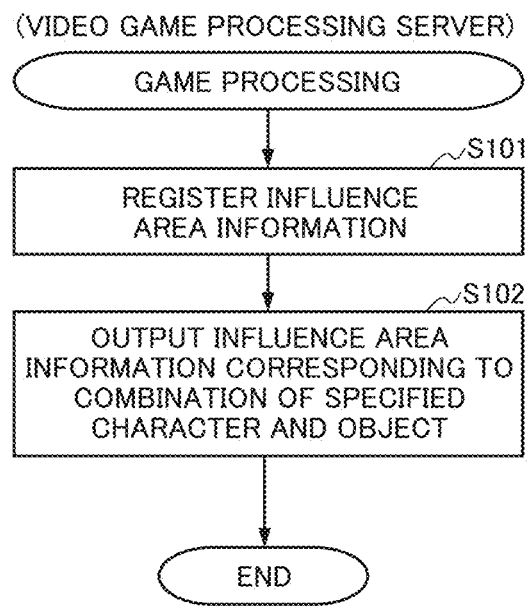
FIG. 4 is a flowchart illustrating an example of an operation of a video game processing server side in the game processing corresponding to at least one of the embodiments of the present disclosure.

FIG. 4 is a flowchart illustrating an example of an operation of a server side in the game processing corresponding to at least one of the embodiments of the present disclosure. Here, an operation of the server 10A in the system 100 will be described again.

When the game processing is started, the server 10A first registers influence area information on a combination of a character and an object (Step S101). Then, in a case where the combination of the character and the object is specified, the server 10A outputs corresponding influence area information (Step S102), and terminates the game processing.

Figure 5:
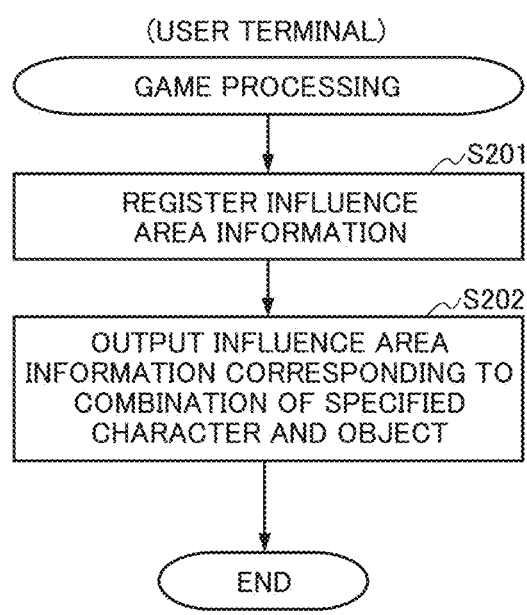
FIG. 5 is a flowchart illustrating an example of an operation of a user terminal side in the game processing corresponding to at least one of the embodiments of the present disclosure.

FIG. 5 is a flowchart illustrating an example of an operation of a user terminal side in the game processing corresponding to at least one of the embodiments of the present disclosure. Hereinafter, a case where the user terminal 20 executes the game processing by a single body will be described as an example. In this regard, the configuration of the user terminal 20 includes the similar functions to those of the server 10A except that the user terminal 20 receives various kinds of information from the server 10A. For this reason, its explanation is omitted from a point of view to avoid repeated explanation.

When the game processing is started, the user terminal 20 first registers influence area information on a combination of a character and an object (Step S201). Then, in a case where the combination of the character and the object is specified, the user terminal 20 outputs corresponding influence area information (Step S202), and terminates the game processing.

As explained above, as one side of the first embodiment, the server 10A is configured so as to at least include the registering unit 11 and the outputting unit 12. Thus, the registering unit 11 registers the influence area information in advance, a relationship between a plurality of unit areas around an object when a character is connected to the object and a structural model constituting the character being set for each of the unit areas in the influence area information for each combination of the character and the object; and the outputting unit 12 outputs, in a case where a certain combination of a character and an object is specified, influence area information corresponding to the certain combination. Therefore, it becomes possible to determine an influence area of an object on a character as a new index indicating characteristics of the object.

Namely, it becomes possible to express the relationship between the character and the object as the influence area information. Therefore, as one of materials for determining a method of using an object newly obtained in AI that controls an NPC or the like, it becomes possible to use the influence area information. Further, for example, by setting an area where a body of a character can move and an area where the body of the character cannot move as the influence area information, when AI uses an object newly obtained, an effect that an animation does not break when trying to move a body of a character toward an area where the body cannot move can be obtained.

Second Embodiment

Figure 6:
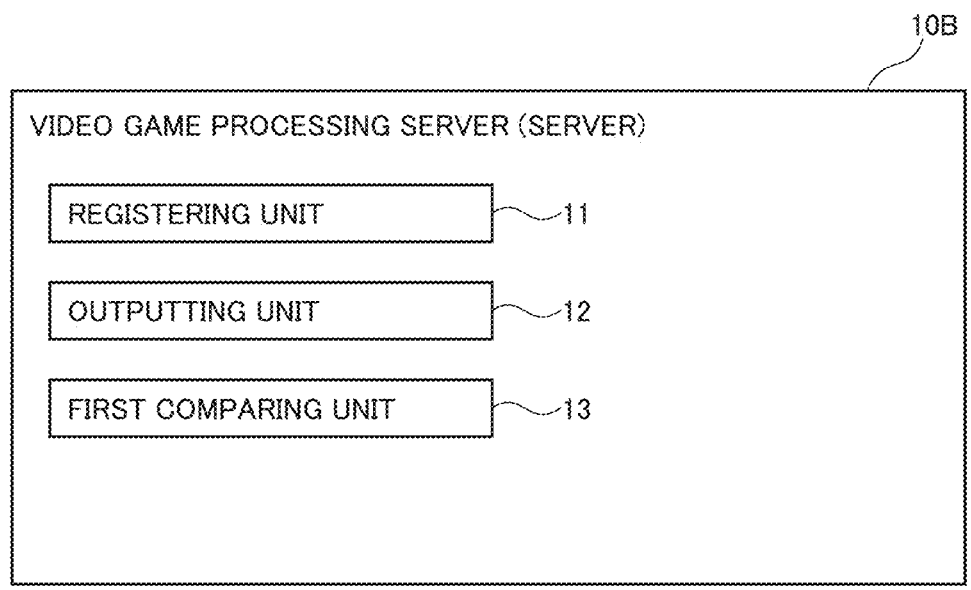
FIG. 6 is a block diagram illustrating a configuration of a video game processing server corresponding to at least one of the embodiments of the present disclosure.

FIG. 6 is a block diagram illustrating a configuration of a video game processing server corresponding to at least one of the embodiments of the present disclosure. A video game processing server 10B (hereinafter, referred to as a "server 10B"), which is an example of the video game processing server 10, will be described with reference to FIG. 6. In the present embodiment, the server 10B at least includes a registering unit 11, an outputting unit 12, and a first comparing unit 13.

The first comparing unit 13 has a function to compare influence area information for a combination of a character and an object with influence area information for a combination of the character and at least one other object to output a first comparison result.

The first comparing unit 13 is configured to compare plural kinds of influence area information for combinations between the same character and a plurality of objects. Here, a method of comparing plural kinds of influence area information may be any method. For example, a method of comparing, with respect to unit areas around an object, influence area information of unit areas of the same position and calculating a degree of coincidence of the influence area information can be considered. The number of objects to be compared by the first comparing unit 13 may be one comparison target object to be compared with a reference character, or may be two or more comparison target objects to be compared with the reference character.

Figure 7:
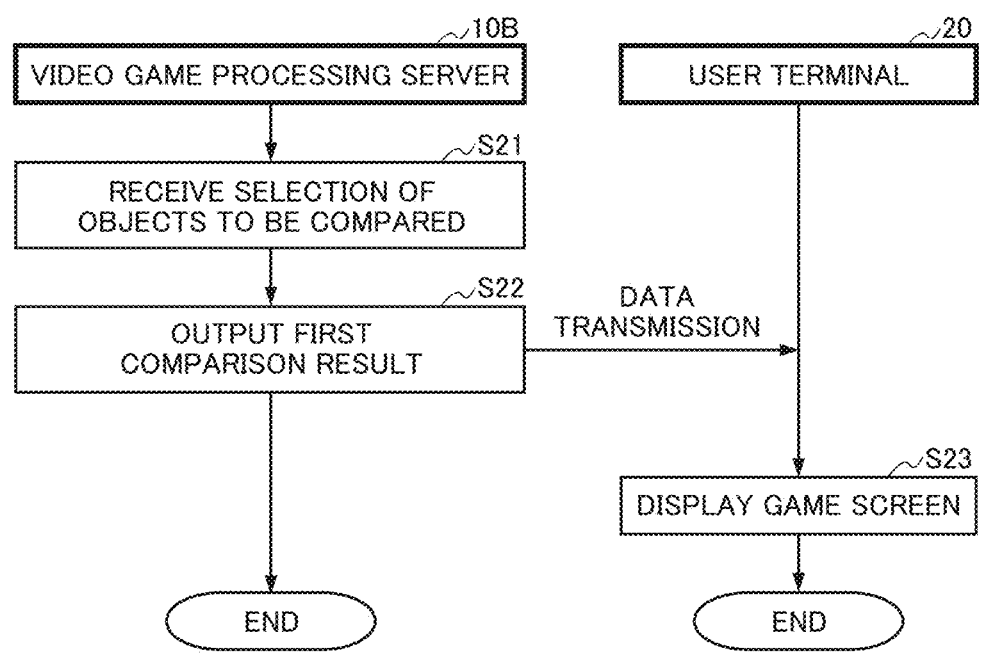
FIG. 7 is a flowchart illustrating an example of game processing corresponding to at least one of the embodiments of the present disclosure.

FIG. 7 is a flowchart illustrating an example of game processing corresponding to at least one of the embodiments of the present disclosure. In the game processing according to the present embodiment, processes related to a control of progress of a video game in response to an operation of the user of the user terminal 20 are executed. Hereinafter, a case where the server 10B and the user terminal 20 execute the game processing will be described as an example. In this regard, a flowchart illustrating an operation of each of the server 10B and the user terminal 20 is omitted from a point of view to avoid repeated explanation.

The game processing is started in a case where a start condition of a first comparing process is satisfied, for example. In a case where a start condition of the first comparing process is satisfied, the server 10B first accepts selection of a character whose influence area information is to be compared, and accepts selection of an object whose influence area information is compared with that of the selected character (Step S21). At this time, one object that is a reference comparison source and at least one object that is a comparison target are selected. Then, the server 10B obtains influence area information of a combination of the selected character and the selected object, which is registered in advance; compares the influence area information of each of at least one object as a comparison target with the influence area information of the character as a comparison source; and outputs a first comparison result (Step S22). The server 10B executes data transmission for reflecting the first comparison result of the influence area information outputted to the user terminal 20. Then, the user terminal 20 receives data for reflecting the first comparison result of the influence area information. If necessary, the user terminal 20 causes a predetermined display device to display a game screen to which the first comparison result of the influence area information is reflected (Step S23), and terminates the game processing.

As explained above, as one side of the second embodiment, the server 10B is configured so as to at least include the registering unit 11, the outputting unit 12, and the first comparing unit 13. Thus, the first comparing unit 13 compares the influence area information for the combination of the character and the object with the influence area information for the combination of the character and the at least one other object to output the first comparison result. Therefore, it becomes possible to compare influence area information of an object as a comparison source regarding a combination with the same character with influence area information of at least one object as a comparison target.

Namely, by using the first comparison result of the influence area information, for example, it becomes possible to calculate and use a degree of similarity of objects from a degree of coincidence of influence area information.

Third Embodiment

Figure 8:
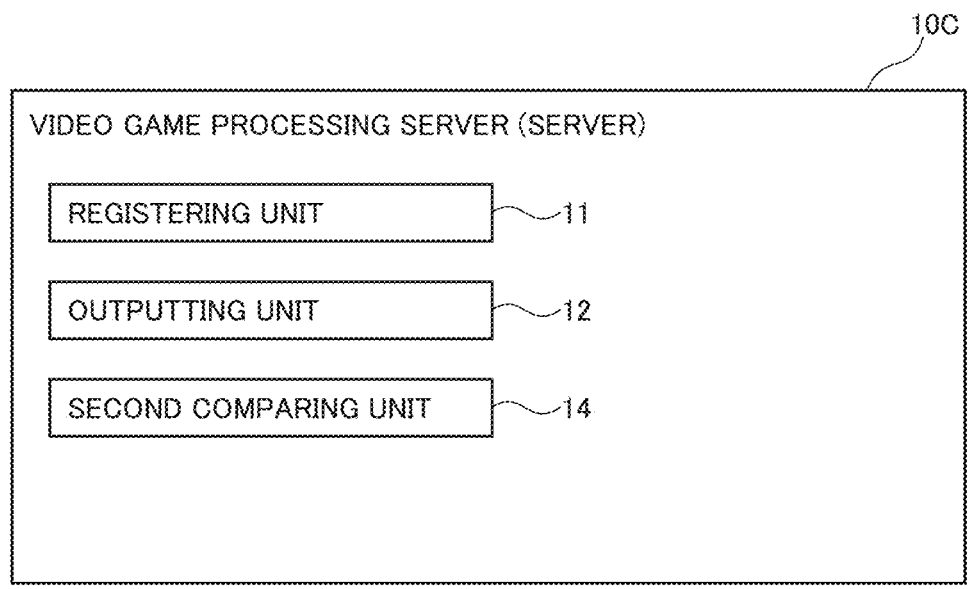
FIG. 8 is a block diagram illustrating a configuration of a video game processing server corresponding to at least one of the embodiments of the present disclosure.

FIG. 8 is a block diagram illustrating a configuration of a video game processing server corresponding to at least one of the embodiments of the present disclosure. A video game processing server 10C (hereinafter, referred to as a "server 10C"), which is an example of the video game processing server 10, will be described with reference to FIG. 8. In the present embodiment, the server 10C at least includes a registering unit 11, an outputting unit 12, and a second comparing unit 14.

The second comparing unit 14 has a function to compare influence area information for a combination of a character and an object with influence area information for a combination of the object and at least one other character to output a second comparison result.

The second comparing unit 14 is configured to compare plural kinds of influence area information regarding combinations of the same object and a plurality of characters. Here, a method of comparing plural kinds of influence area information may be any method. For example, a method of comparing, with respect to unit areas around an object, influence area information of unit areas of the same position and calculating a degree of coincidence of the influence area information can be considered. The number of characters to be compared by the second comparing unit 14 may be one comparison target character to be compared with a reference object, or may be two or more comparison target characters to be compared with the reference object.

Figure 9:
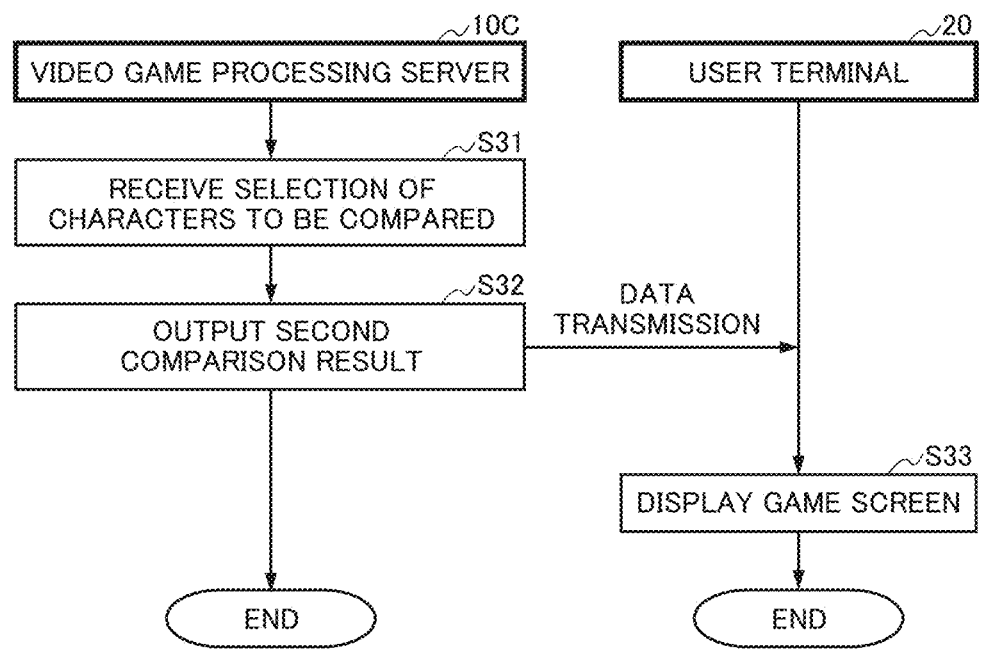
FIG. 9 is a flowchart illustrating an example of game processing corresponding to at least one of the embodiments of the present disclosure.

FIG. 9 is a flowchart illustrating an example of game processing corresponding to at least one of the embodiments of the present disclosure. In the game processing according to the present embodiment, processes related to a control of progress of a video game in response to an operation of the user of the user terminal 20 are executed. Hereinafter, a case where the server 10C and the user terminal 20 execute the game processing will be described as an example. In this regard, a flowchart illustrating an operation of each of the server 10C and the user terminal 20 is omitted from a point of view to avoid repeated explanation.

The game processing is started in a case where a start condition of a second comparing process is satisfied, for example. In a case where a start condition of the second comparing process is satisfied, the server 10C first accepts selection of an object whose influence area information is to be compared, and accepts selection of a character whose influence area information is compared with that of the selected object (Step S31). At this time, one character that is a reference comparison source and at least one character that is a comparison target are selected. Then, the server 10C obtains influence area information of a combination of the selected character and the selected object, which is registered in advance; compares the influence area information of each of at least one character as a comparison target with the influence area information of the object as a comparison source; and outputs a second comparison result (Step S32). The server 10C executes data transmission for reflecting the second comparison result of the influence area information outputted to the user terminal 20. Then, the user terminal 20 receives data for reflecting the second comparison result of the influence area information. If necessary, the user terminal 20 causes a predetermined display device to display a game screen to which the second comparison result of the influence area information is reflected (Step S33), and terminates the game processing.

As explained above, as one side of the third embodiment, the server 10C is configured so as to at least include the registering unit 11, the outputting unit 12, and the second comparing unit 14. Thus, the second comparing unit 14 compares the influence area information for the combination of the character and the object with the influence area information for the combination of the object and the at least one other character to output the second comparison result. Therefore, it becomes possible to compare influence area information of at least one character as a comparison target with influence area information of a character regarding a combination with the same object as a comparison target.

Namely, by using the second comparison result of the influence area information, for example, it becomes possible to execute a process based on a difference of bodies of characters with respect to the same object.

Fourth Embodiment

Figure 10:
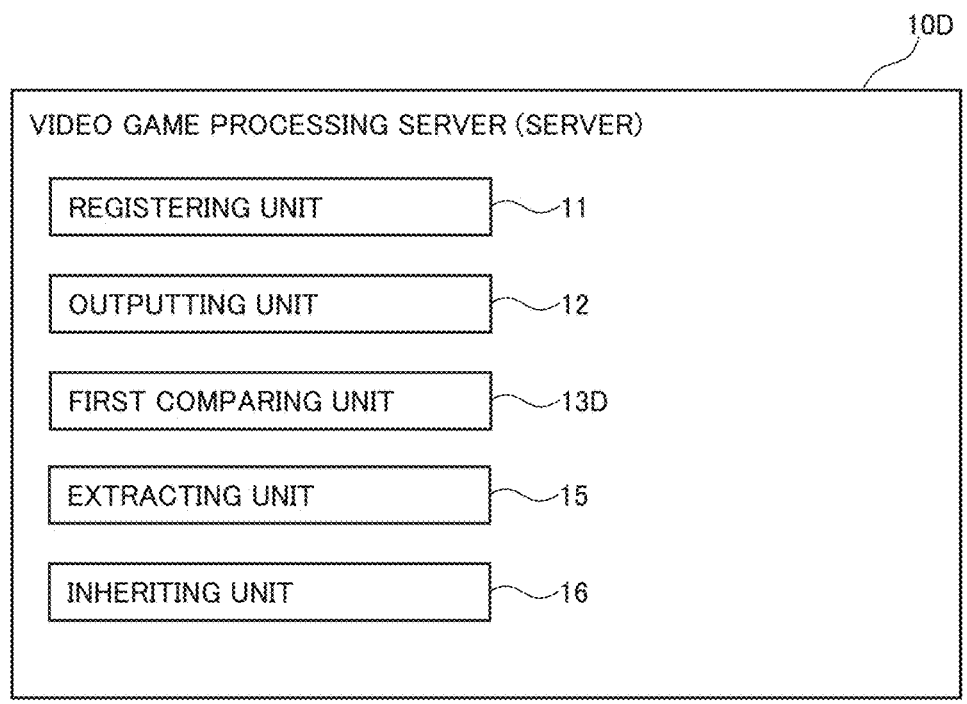
FIG. 10 is a block diagram illustrating a configuration of a video game processing server corresponding to at least one of the embodiments of the present disclosure.

FIG. 10 is a block diagram illustrating a configuration of function a video game processing server corresponding to at least one of the embodiments of the present disclosure. A video game processing server 10D (hereinafter, referred to as a "server 10D"), which is an example of the video game processing server 10, will be described with reference to FIG. 10. In the present embodiment, the server 10D at least includes a registering unit 11, an outputting unit 12, a first comparing unit 13D, an extracting unit 15, and an inheriting unit 16.

The first comparing unit 13D has a function to compare influence area information for a combination of a character and an object with influence area information for a combination of the character and at least one other object to output a first comparison result. In the present embodiment, a new object (will be described later) is set to an object as a comparison source, and a selection standard obtained object (will be described later) is compared with influence area information as comparison target object to output a first comparison result.

The extracting unit 15 has a function to extract a similar object similar to an object newly obtained by the character (hereinafter, referred to as a "new object") from one or more objects whose selection standards have already been stored by the character (hereinafter, referred to as "selection standard stored objects"). Further, the extracting unit 15 calculates a degree of similarity between objects from a degree of coincidence of one or more item regarding the property of the object, which consists of at least one item, between the new object and each of the one or more selection standard stored objects, and extracts a similar object on the basis of the degrees of similarity. Then, the extracting unit 15 uses the first comparison result of the influence area information by the first comparing unit 13D as a part or all of the items for calculating the degree of similarity.

Here, the selection standard is a standard for selecting an action that a character is caused to carry out when the character is caused to use an object to which at least one use application (that is, the action) is set. It can be considered that the selection standard is defined by a selection probability set for each of one or more actions set to an object. In the present embodiment, it is assumed that a selection standard for each object is stored for each character.

Further, the object means a virtual object that appears in a video game. In particular, the object according to the present embodiment targets at one used by a character. Moreover, at least one use application (action) is set to the object. In a case where there is a plurality of executable actions, one action to be carried out by the character is determined on the basis of this selection standard. As the action, "throw", "eat", or "burn" is set, for example.

Further, the character means something that appears and acts in the video game. The characters include a character that acts on the basis of a user operation and a character that autonomically acts regardless of a user operation. However, the character according to the present embodiment at least autonomically selects an action against an object regardless of a user operation. The character that autonomically acts is not limited particularly. Such a character may be a non-player character (NPC) that does not accept any user operation completely in the video game, or a character that accepts an operation of a part of users in some situations and does not accept an operation of the other user in other situations. As an example of the character that autonomically acts, there is a character that autonomically recognize objects around the character, makes decision and acts.

Further, the object whose selection standard has already been stored by the character (selection standard stored object) includes an object whose selection standard is newly stored or updated on the basis of some event or the like in the video game in addition to an object whose selection standard is stored by an inheriting process (will be described later). Here, the event includes both a case of specifying information processing that occurs when a predetermined condition is satisfied in internal processing of the video game, and a case of specifying an occurrence that occurs in a character or the like in a story of the video game. Further, as an initial setting of the video game, there may exist an object that is treated as a selection standard stored object for a certain character from the beginning. In this manner, the "event or the like" is used to include an object that is treated as a selection standard stored object on the basis of a condition other than an event. On the other hand, the new object means an object whose selection standard has not been newly stored and updated. Namely, an object that does not have a selection standard as an initial setting and in which any selection standard has not been stored newly, or an object whose selection standard stored as an initial setting has never been updated is expressed as a new object. Further, an object whose selection standard has not been newly stored and updated is defined as a new object, but even an object whose selection standard is newly stored and updated may be treated as a new object by conditioning in the video game.

Further, "similar" with respect to objects means a state where two objects to be compared have many common points with respect to properties had by an object. The similar object means an object whose degree of similarity satisfies a predetermined standard. The extracting unit 15 executes a process to extract a selection standard stored object similar to a new object newly obtained by a character as a similar object. Conditions for determining to be similar can be appropriately set. In the present embodiment, it is assumed that the first comparison result of the influence area information by the first comparing unit 13D is used as at least a part of the conditions for determining to be similar. Namely, it can be considered an object having a higher degree of coincidence of the influence area information as the first comparison result by the first comparing unit 13D is extracted as a similar object.

The inheriting unit 16 has a function to set, at least for actions set in common between the similar object and the new object, a selection probability of each action in a selection standard stored so as to be associated with the new object on the basis of a selection probability of each action in a selection standard stored so as to be associated with the similar object.

An inheriting process is a process to set a selection standard of a new object on the basis of a selection standard of a similar object. The concrete processing content may be any method so long as it is set on the basis of a selection standard of a similar object. For example, a process can be considered in which a selection probability of each action in a selection standard of a new object approaches a selection probability of the corresponding action in a selection standard of a similar object. As a concrete example, a process can be considered in which for at least actions set in common, a value indicating a selection probability of each action in a selection standard of a similar object is added to a value of a selection probability of the corresponding action in a selection standard of a new object, and a normalization process is then executed so that the sum of the values of the selection probabilities becomes 100%. The selection standard of the new object after execution of the inheriting process is stored in a storage device 103 as a selection standard of a new object related to the character. In this regard, the new object may be configured to have a selection standard as an initial setting, or may be configured not to have any selection standard and store a selection standard only by an inheriting process. The inheriting process by the inheriting unit 16 may be executed at timing when a character obtains an object, or may be executed at timing immediately before a character selects an action against an object. Namely, the inheriting process by the inheriting unit 16 is executed when a predetermined start condition of the inheriting process is satisfied.

Figure 11:
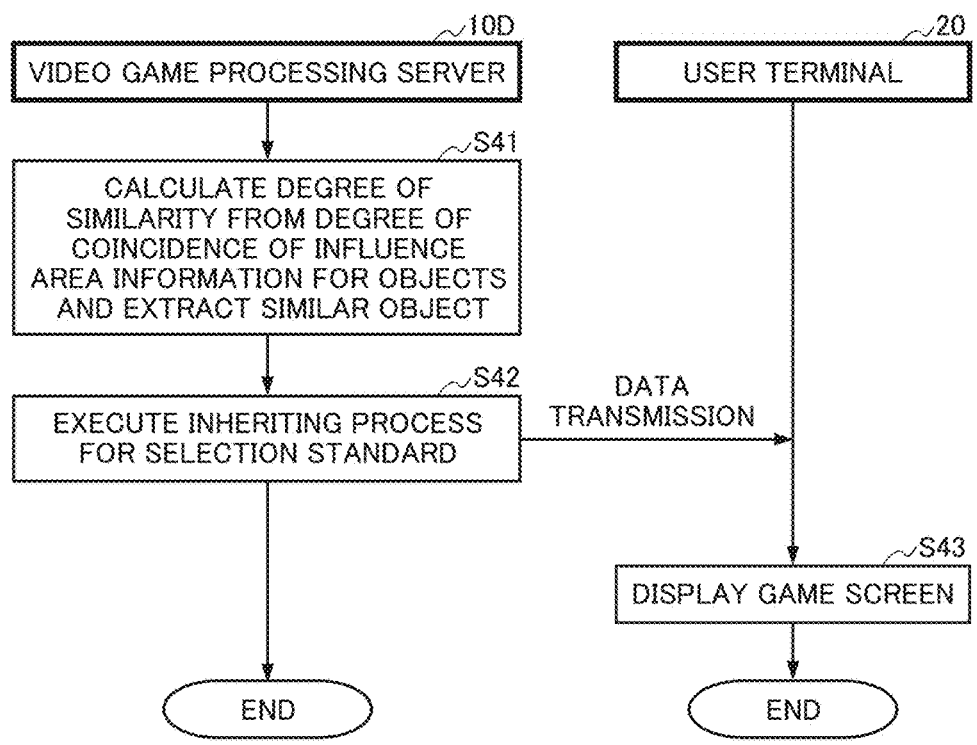
FIG. 11 is a flowchart illustrating an example of game processing corresponding to at least one of the embodiments of the present disclosure.

FIG. 11 is a flowchart illustrating an example of game processing corresponding to at least one of the embodiments of the present disclosure. In the game processing according to the present embodiment, processes related to a control of progress of the video game in response to an operation of the user of the user terminal 20 are executed. Hereinafter, a case where the server 10D and the user terminal 20 execute the game processing will be described as an example. In this regard, a flowchart illustrating an operation of each of the server 10D and the user terminal 20 is omitted from a point of view to avoid repeated explanation.

The game processing is started in a case where a start condition of an inheriting process for a new object is satisfied, for example. In a case where a start condition of the inheriting process for a new object is satisfied, the server 10D first executes comparison of influence area information between the new object and each of one or more selection standard stored objects. The server 10D calculates a degree of similarity between objects from a degree of coincidence of the influence area information, and extracts a similar object on the basis of the degree of similarity (Step S41). Then, the server 10D executes the inheriting process from a selection standard of the similar object to a selection standard of the new object (Step S42). Then, the server 10D stores the selection standard of the new object after execution of the inheriting process, and executes data transmission for reflecting an influence based on a situation that the inheriting process has been executed to the user terminal 20. Then, the user terminal 20 receives data after the inheriting process. If necessary, the user terminal 20 causes a predetermined display device to display a game screen to which the inheriting process is reflected (Step S43), and terminates the game processing.

As explained above, as one side of the fourth embodiment, the server 10D is configured so as to at least include the registering unit 11, the outputting unit 12, the first comparing unit 13D, the extracting unit 15, and the inheriting unit 16. Thus, the extracting unit 15 extracts the similar object similar to the object newly obtained by the character (hereinafter, referred to as the "new object") from the one or more objects whose selection standards have already been stored by the character (hereinafter, referred to as the "selection standard stored objects"); the inheriting unit 16 sets, at least for the actions set in common between the similar object and the new object, the selection probability of each action in the selection standard stored so as to be associated with the new object on the basis of the selection probability of each action in the selection standard stored so as to be associated with the similar object; and the first comparing unit 13D compares the influence area information for the combination of the character and the object with the influence area information for the combination of the character and the at least one other object to output the first comparison result. Therefore, it becomes possible to set a selection standard of a new object on the basis of a selection standard of a similar object extracted based on comparison of influence area information.

Namely, it is possible to extract a similar object, which becomes an inheritance source for a new object, from objects that can be determined to be similar on the basis of a high degree of coincidence of influence area information. Therefore, it becomes possible to select an action for a new object after execution of an inheriting process by inheritance that does not cause a sense of incongruity similar to a similar object. For example, in a case where a method of using an item has the specification that AI learns it and a selection probability of an action thereby changes, a similar object is extracted on the basis of influence area information to execute an inheriting process. Thus, the selection probability for the similar object after learning is inherited to the new object, selection of an action is executed for the new object with the selection probability after inheritance. By having this specification, a learning result for the similar object similar to the new object is also reflected to action selection of the new object. Therefore, even a new object is used on the basis of past experience, and this makes it possible to represent a natural situation. Further, by configuring to extract the similar object on the basis of the influence area information, in an update-type video game whose content is updated as needed, there is no need to carry out work for defining whether an object such as an item to be added later is similar to an existing object or not each time the content is added. Therefore, there is an effect that it is possible to reduce the work at the time of updating significantly.

Fifth Embodiment

In a fifth embodiment, a configuration that allows execution of various processes to set influence area information to a plurality of unit areas around an object and treat the influence area information as an affordance, for example, execution of a process to determine a degree of similarity of objects on the basis of the influence area information (the affordance) will be described.

In case of a conventional technique that defines all similar relations of items in advance in order to calculate a degree of similarity of the objects, for example, in a game in which the content is added each time the version is updated, there has been a problem that whether each of all objects such as items to be added later is similar to an existing object or not must be defined each time the content is added, and this causes an enormous amount of work during updating. However, as in the present embodiment, by configuring to express, by influence area information, a more obvious attribute of an object, that is, an affordance, which is a property of an object itself that does not require setting or definition of a relationship with other objects, and use it for calculation of a degree of similarity between objects, influence area information may be set only for an object added later without considering a relationship with other objects. Therefore, it becomes possible to greatly reduce a work load at the time of version update.

Figure 12:
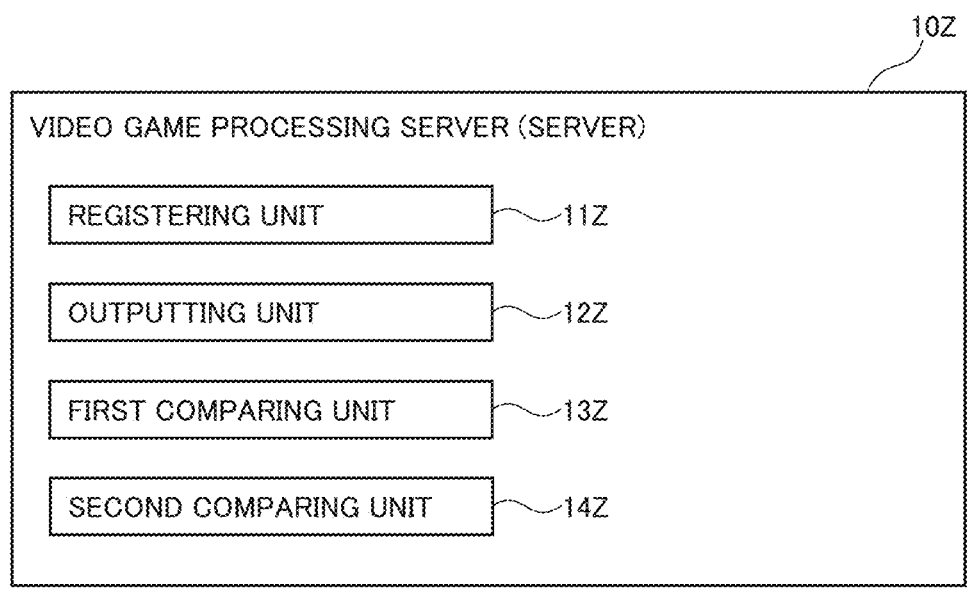
FIG. 12 is a block diagram illustrating a configuration of a video game processing server corresponding to at least one of the embodiments of the present disclosure.

FIG. 12 is a block diagram illustrating a configuration of a video game processing server 10Z (hereinafter, referred to as a "server 10Z"), which is an example of the video game processing server 10. In the present embodiment, the server 10Z at least includes a registering unit 11Z, an outputting unit 12Z, a first comparing unit 13Z, and a second comparing unit 14Z.

The registering unit 11Z has a function to register influence area information in advance. A relationship between a plurality of unit areas around an object when a character is connected to the object and a structural model constituting the character is set for each of the unit areas in the influence area information for each combination of the character and the object.

Here, the character means something that appears and acts in a video game. The character includes something that acts on the basis of a user operation and something that autonomically acts regardless of a user operation. However, the character according to the present embodiment at least autonomically acts a behavior using an object regardless of a user operation. The character that autonomically acts is not limited particularly. Such a character may be a non-player character (NPC) that does not completely accept an operation of the user in the video game, or may be a character in which a situation to accept some operations of the user exists, but that does not accept any operation of the user in the other situation. As an example of the character that autonomically acts, there is a character that autonomically recognizes surrounding objects, makes decisions, and carries out a behavior. In this regard, the character according to the present embodiment does not necessarily have to be a human, and may be any character so long as it is treated as an intellectual subject.

Further, the object means a virtual object that appears in the video game. In particular, the object according to the present embodiment is an object that is to be used by the character. Further, at least one connection point is set to the object, and is connected to the character and used. Here, the connection means that a character and an object become a connecting state and the object becomes an operable state on the basis of the intention of the character. As examples of the connection, a case where a robot-type character is equipped with a weapon as an object can be considered in addition to an action of the character to grasping by hand.

Further, the unit area means the smallest unit area obtained by dividing a space around an object into predetermined sizes. In a case where a game space is represented in two dimensions, the unit area becomes a plane area with a predetermined size. In a case where the game space is represented in three dimensions, the unit area becomes a voxel with a predetermined size.

Further, the structural model constituting the character means a model that represents a skeletal structure of the character such as a length of a bone and a joint position of the character. Further, it is conceivable that information on a movable range of the joint position is also provided in addition to information on the joint position.

Further, the influence area information means information that represents a relationship between each of a plurality of unit areas around an object and a structural model constituting a character. The entire surrounding space with a size set in advance is divided into a plurality of unit areas, and information indicating a relationship is set to each unit area. The relationship can be set in various ways. For example, it can be considered to set a relationship such as an area where a body of a character can move and an area where the body of the character cannot move. As one example of a method of setting a relationship, a method of setting a parameter, a flag, or the like according to a relationship can be considered. The extent to which influence area information is set around an object can be determined appropriately as the specifications of the video game. Further, any relationship between the character and the object, which is treated as the influence area information, may be used. Further, in a case where there is a plurality of connection points between the character and the object, the influence area information may be registered for each connection point. Since the influence area information is information in which a relationship between a character and an object is registered for each connection point, the structural model thereof also changes if the character changes. Thus, when the relationship changes, the influence area information also differs, and when the object changes, the relationship changes and the influence area information also differs because a shape and the like of the object differs. Namely, the influence area information is registered for each combination of the character, the object, and the connection position thereof.

The outputting unit 12Z has a function to output, in a case where a certain combination of a character and an object is specified, influence area information corresponding to the certain combination. In a case where a combination of a character and an object is specified for the outputting unit 12Z in a situation where the influence area information is required, the outputting unit 12Z refers to the information on the specified combination of the character and the object registered by the registering unit 11Z, and identifying influence area information to output the identified influence area information. In this regard, in a case where there is a plurality of connection methods for the combination of the character and the object, it goes without saying that the influence area information may be identified by using information for specifying the connection point in addition to the combination of the character and the object.

The first comparing unit 13Z has a function to compare influence area information for a combination of a character and an object with influence area information for a combination of the character and at least one other object to output a first comparison result.

The first comparing unit 13Z is configured to compare plural kinds of influence area information for combinations between the same character and a plurality of objects. Here, a method of comparing plural kinds of influence area information may be any method. For example, a method of comparing, with respect to unit areas around an object, influence area information of unit areas of the same position and calculating a degree of coincidence of the influence area information can be considered. The number of objects to be compared by the first comparing unit 13Z may be one comparison target object to be compared with a reference character, or may be two or more comparison target objects to be compared with the reference character.

The second comparing unit 14Z has a function to compare influence area information for a combination of a character and an object with influence area information for a combination of the object and at least one other character to output a second comparison result.

The second comparing unit 14Z is configured to compare plural kinds of influence area information regarding combinations of the same object and a plurality of characters. Here, a method of comparing plural kinds of influence area information may be any method. For example, a method of comparing, with respect to unit areas around an object, influence area information of unit areas of the same position and calculating a degree of coincidence of the influence area information can be considered. The number of characters to be compared by the second comparing unit 14Z may be one comparison target character to be compared with a reference object, or may be two or more comparison target characters to be compared with the reference object.

By comparing plural kinds of influence area information for combinations of the same object and a plurality of characters by the second comparing unit 14Z, for example, it becomes possible to determine whether a target character can use an object or not on the basis of a physique of a character (height, waist circumference, and the like), and determine whether the target character corresponds to equipment restriction based on the physique set for the object. An affordance is defined on the basis of body information of a person involved. For example, even with the same sword, the affordance is different for adults and children, and the affordance is also different for tribes with different physiques. By comparing the affordance of the plurality of characters regarding the same object using this point, it is possible to determine whether an object can be equipped or not on the basis of comparison with a character that can equip the object, and determine whether an object falls under equipment restriction or not on the basis of a physique thereof. For example, by registering voxel information indicating the affordance of the sword for adults and voxel information indicating the affordance of the sword for children, it becomes possible to execute a process to determine whether a body of the character customized by the user (height, physique, or the like can also be changed) is closer to that of an adult or that of a child, and match the closer equipment restriction.

Figure 13:
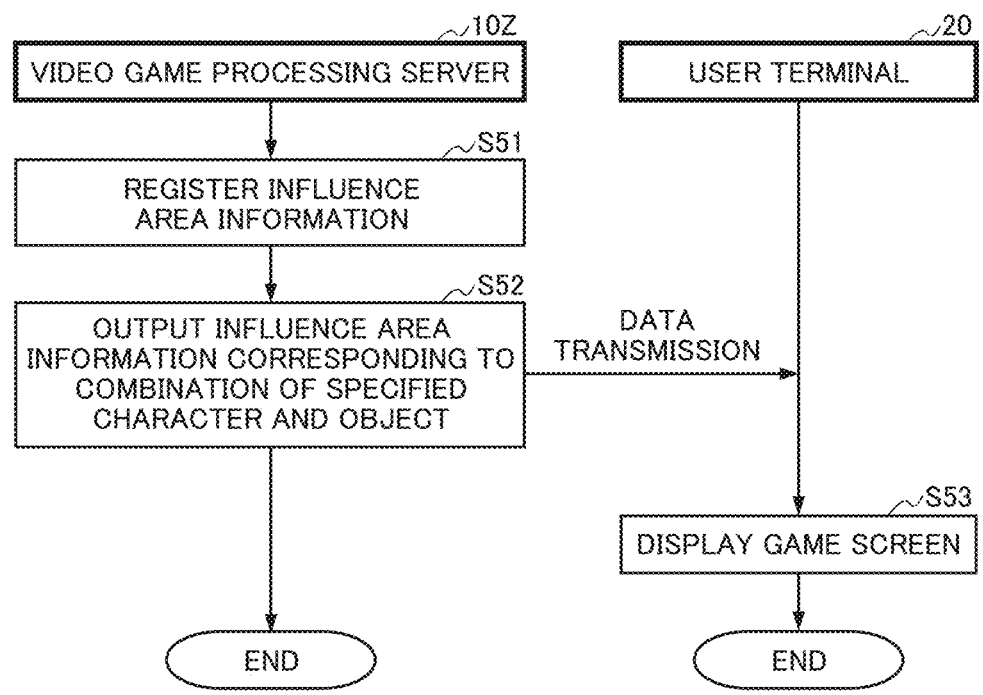
FIG. 13 is a flowchart illustrating an example of an outputting process of influence area information in game processing corresponding to at least one of the embodiments of the present disclosure.

FIG. 13 is a flowchart illustrating an example of an outputting process of influence area information in game processing corresponding to at least one of the embodiments of the present disclosure. In the outputting process according to the present embodiment, processes related to a control of progress of the video game in response to an operation of the user of the user terminal 20 are executed. Hereinafter, a case where the server 10Z and the user terminal 20 execute the outputting process will be described as an example. In this regard, a flowchart illustrating an operation of each of the server 10Z and the user terminal 20 is omitted from a point of view to avoid repeated explanation.

When the outputting process is started, the server 10Z first registers influence area information on a combination of a character and an object (Step S51). Then, in a case where the combination of the character and the object is specified, the server 10Z outputs corresponding influence area information (Step S52). The server 10Z executes data transmission for reflecting an influence of a process based on the influence area information outputted to the user terminal 20. Then, the user terminal 20 receives data for reflecting the influence area information. If necessary, the user terminal 20 causes a predetermined display device to display a game screen to which the process based on the influence area information is reflected (Step S53), and terminates the outputting process.

Figure 14:
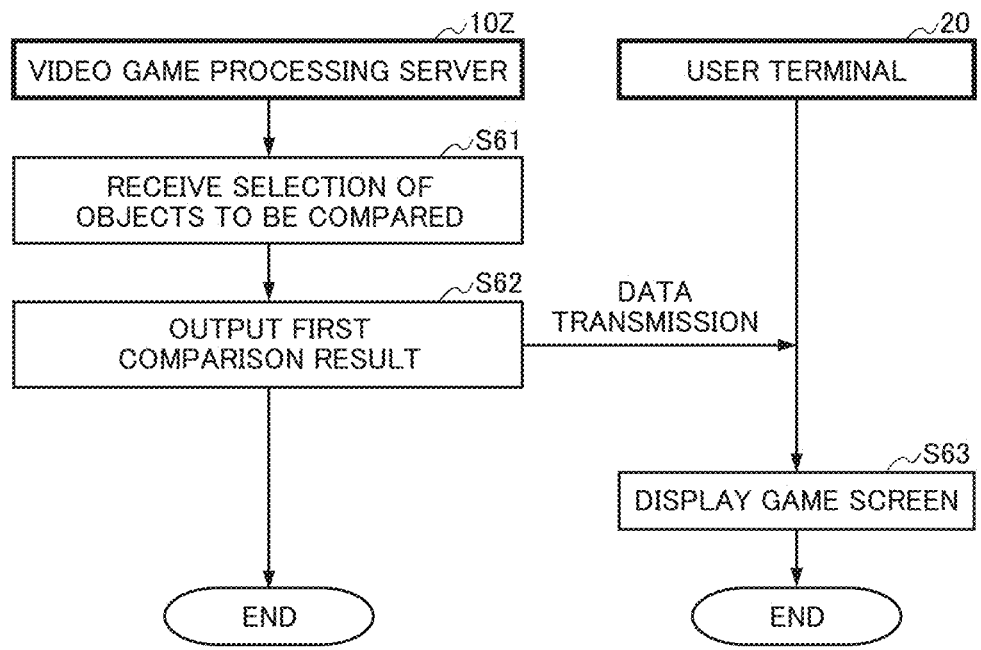
FIG. 14 is a flowchart illustrating an example of a first comparing process in game processing corresponding to at least one of the embodiments of the present disclosure.

FIG. 14 is a flowchart illustrating an example of a first comparing process in the game processing corresponding to at least one of the embodiments of the present disclosure. In the first comparing process according to the present embodiment, processes related to a control of progress of the video game in response to an operation of the user of the user terminal 20 are executed. Hereinafter, a case where the server 10Z and the user terminal 20 execute the first comparing process will be described as an example. In this regard, a flowchart illustrating an operation of each of the server 10Z and the user terminal 20 is omitted from a point of view to avoid repeated explanation.

The first comparing process is started in a case where a start condition of a first comparing process is satisfied, for example. In a case where a start condition of the first comparing process is satisfied, the server 10Z first accepts selection of a character whose influence area information is to be compared, and accepts selection of an object whose influence area information is compared with that of the selected character (Step S61). At this time, one object that is a reference comparison source and at least one object that is a comparison target are selected. Then, the server 10Z obtains influence area information of a combination of the selected character and the selected object, which is registered in advance; compares the influence area information of each of at least one object as a comparison target with the influence area information of the character as a comparison source; and outputs a first comparison result (Step S62). The server 10Z executes data transmission for reflecting the first comparison result of the influence area information outputted to the user terminal 20. Then, the user terminal 20 receives data for reflecting the first comparison result of the influence area information. If necessary, the user terminal 20 causes a predetermined display device to display the game screen to which the first comparison result of the influence area information is reflected (Step S63), and terminates the first comparing process.

Figure 15:
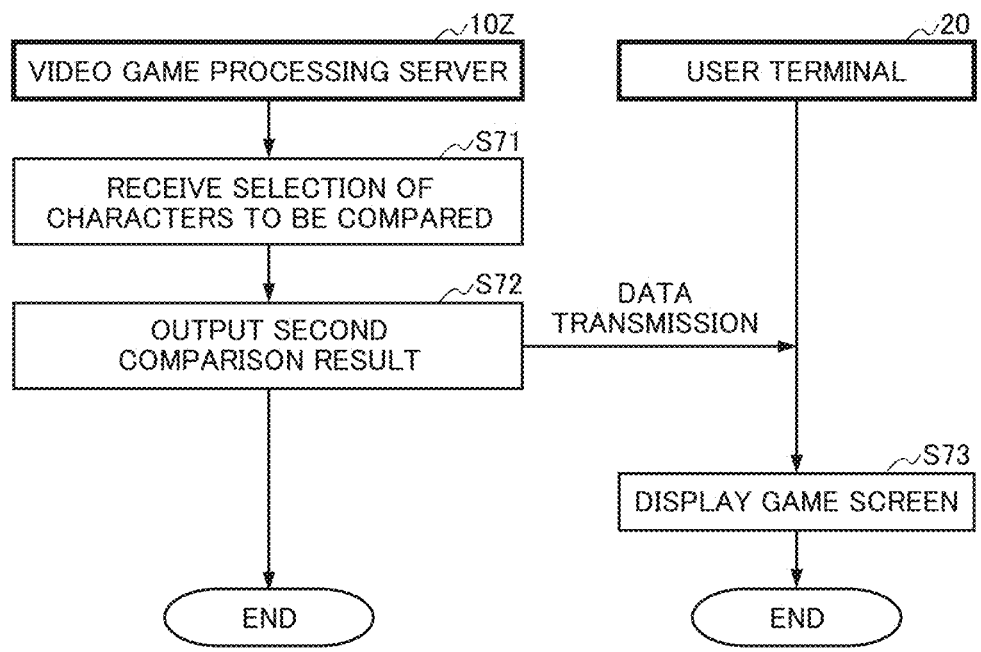
FIG. 15 is a flowchart illustrating an example of a second comparing process in game processing corresponding to at least one of the embodiments of the present disclosure.

FIG. 15 is a flowchart illustrating an example of a second comparing process in the game processing corresponding to at least one of the embodiments of the present disclosure. In the second comparing process according to the present embodiment, processes related to a control of progress of the video game in response to an operation of the user of the user terminal 20 are executed. Hereinafter, a case where the server 10Z and the user terminal 20 execute the second comparing process will be described as an example. In this regard, a flowchart illustrating an operation of each of the server 10Z and the user terminal 20 is omitted from a point of view to avoid repeated explanation.

The second comparing process is started in a case where a start condition of a second comparing process is satisfied, for example. In a case where a start condition of the second comparing process is satisfied, the server 10Z first accepts selection of an object whose influence area information is to be compared, and accepts selection of a character whose influence area information is compared with that of the selected object (Step S17). At this time, one character that is a reference comparison source and at least one character that is a comparison target are selected. Then, the server 10Z obtains influence area information of a combination of the selected character and the selected object, which is registered in advance; compares the influence area information of each of at least one character as a comparison target with the influence area information of the object as a comparison source; and outputs a second comparison result (Step S72). The server 10Z executes data transmission for reflecting the second comparison result of the influence area information outputted to the user terminal 20. Then, the user terminal 20 receives data for reflecting the second comparison result of the influence area information. If necessary, the user terminal 20 causes a predetermined display device to display a game screen to which the second comparison result of the influence area information is reflected (Step S73), and terminates the second comparing process.

Now, the influence area information adopted in the present embodiment can be expected to be treated in various manners as a new index for expressing a relationship between a character and an object. For example, it can be used to treat an "affordance". Here, the affordance is a concept that means an influence of environment on animals (intellectual subjects). It is assumed that in a case where a character comes into contact with an object, an influence that the object gives to the character is expressed by the influence area information. By registering influence area information as an affordance for each combination of a character and an object, it becomes possible to execute a process to obtain any information from the influence area information as the affordance for the object newly obtained by the character, and execute a process to consider how to handle the object.

In this regard, the concept of the affordance is known. However, it is considered that it is a new idea that after interpreting a structural model of the character in the video game as a virtual body of character AI, the affordance, which is a relationship between the character and the object, is expressed by voxels around the object and is "visualized".

Figure 16:
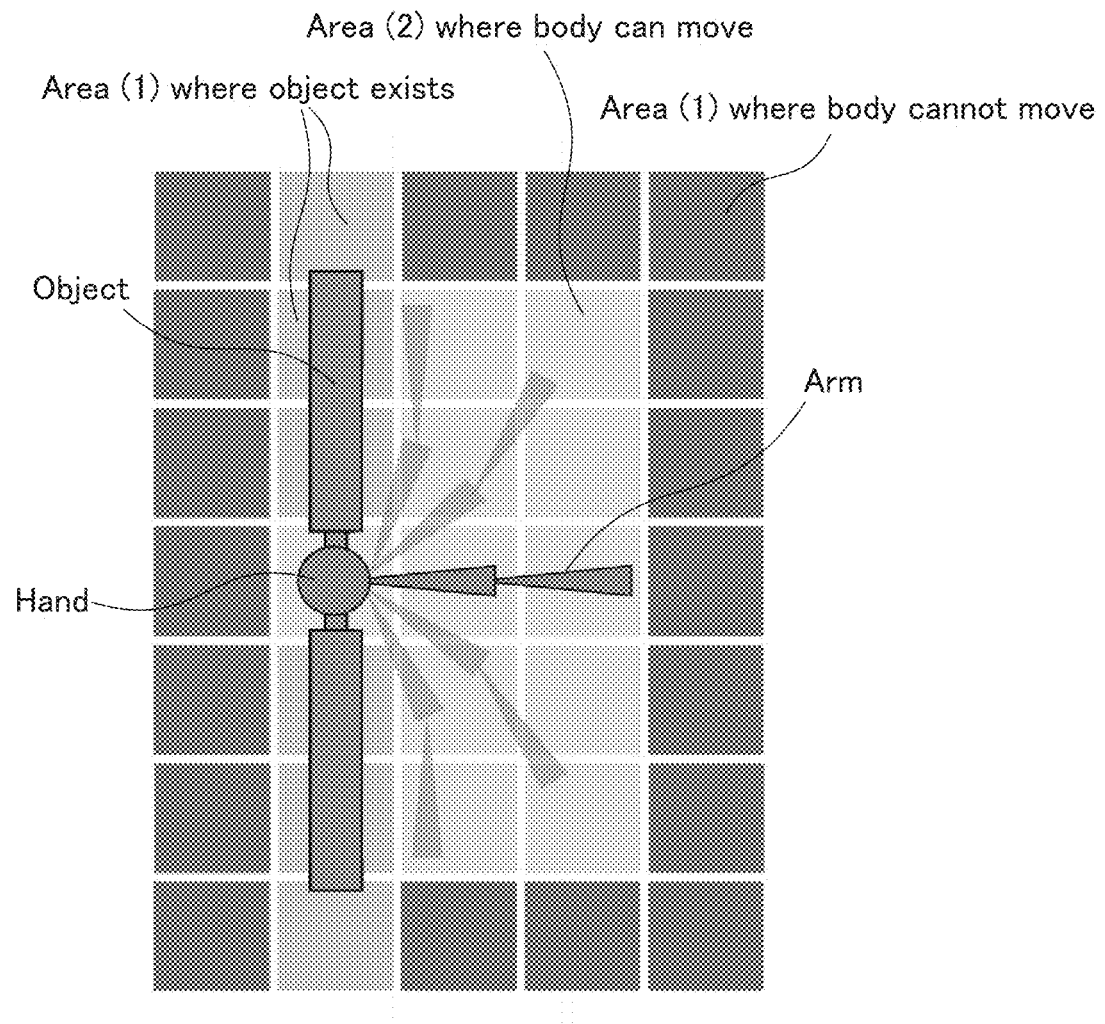
FIG. 16 is an explanatory drawing for explaining an example of setting of influence areas in the game processing corresponding to at least one of the embodiments of the present disclosure.

FIG. 16 is an explanatory drawing for explaining an example of setting of influence areas in the game processing corresponding to at least one of the embodiments of the present disclosure. FIG. 16 represents an object as a weapon that is assumed to be grasped by a character at a central portion in a length direction. As influence area information to be set to this object, a state where the same influence area information (for example, a flag of "1") is given to an area where a body of the character cannot move in a state of grasping the object and an area where the object itself exists, and the same influence area information (for example, a flag of "2") is given to an area where the body can move in a state of grasping the object by the character is expressed. In FIG. 16, the influence area information is set in two dimensions. However, in case of three dimensions, influence area information is set for each voxel as a unit area. Further, although it is explained that one of two patterns of influence area information is given, this is only an example, and different influence area information (for example, a flag of "3") may be set for an area where the object itself exists. Alternatively, different influence area information (for example, a flag of "4") may be set for an area corresponding to the connection point with the character, and various settings can be made appropriately.

Figure 17:
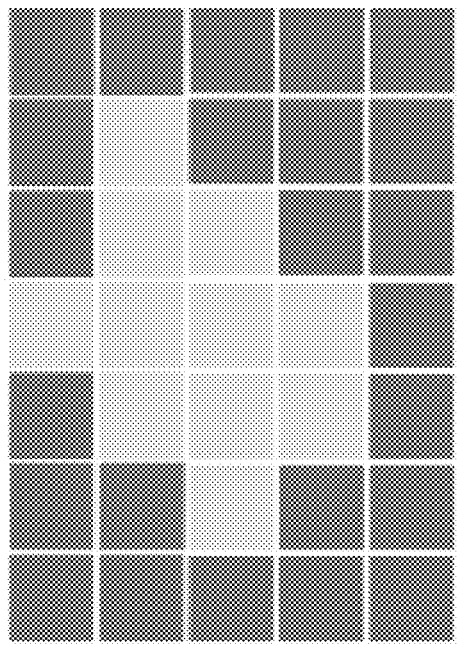
FIG. 17 is an explanatory drawing for explaining an example of comparison of influence areas in the game processing corresponding to at least one of the embodiments of the present disclosure.
Figure 17:
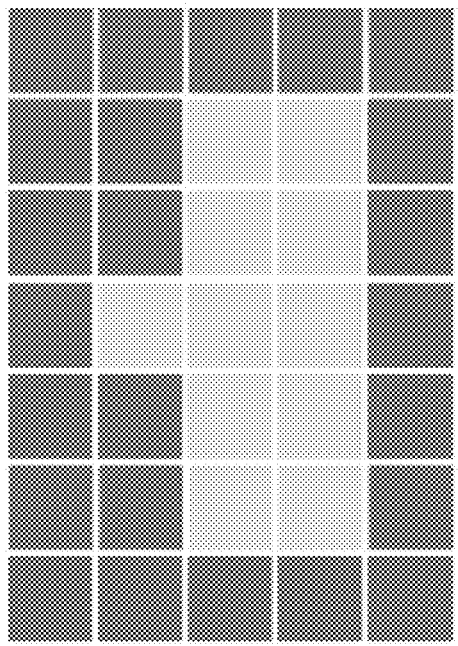
Figure 17:
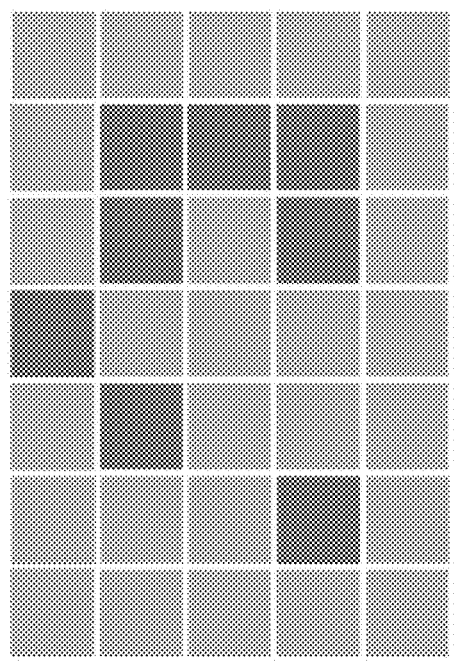

FIG. 17 is an explanatory drawing for explaining an example of comparison of influence areas in the game processing corresponding to at least one of the embodiments of the present disclosure. FIG. 17 illustrates a state where influence area information of an item A for the same character is compared with influence area information of an item B for the same character. As illustrated in FIG. 17, in a case where the influence area information is set for each, unit areas existing in the same position are compared to determine whether the influence area information is the same or different, and a degree of coincidence in a predetermined space to which the influence area information is set is calculated. The example of FIG. 17 indicates that the degree of coincidence is 77.14%. As described above, the influence area information may be compared to calculate the degree of coincidence, and may determine that an object with a high degree of coincidence is a similar object.

With reference to FIG. 17, the case where the ranges in which the influence area information is set for the item A and the item B completely match has been described as an example, but this is not the only case. In a case where the ranges in which the influence area information is set are different from each other, it may be possible that two objects to be compared do not have a corresponding unit area. If such a point where there is no unit area corresponding to the other item is included in calculation of a degree of coincidence, there is a risk that an appropriate degree of coincidence cannot be calculated. Therefore, the point where there is no unit area corresponding to the other item may be excluded from a target for calculation of a degree of coincidence.

Further, as another example of a method of calculating a degree of similarity of objects, a degree of similarity (or a degree of coincidence) may be calculated by focusing on some unit areas of the influence area information. For example, an area where the body cannot move in FIG. 16 is excluded from unit areas as comparison targets. Then, unit areas other than the area where the body cannot move may be compared. Further, in a case where two types of an area where a body of a character can move and an area where the body of the character cannot move are treated as the influence area information, it can be considered that a degree of similarity of objects is calculated by focusing on only the influence area information indicating that it is the area where the body of the character can move. This makes it possible to carefully select and compare only the unit areas that are important for comparison. Therefore, for example, appropriate comparison can be made for two objects that are significantly different in size.

As described above, by setting the influence area information for the combination of the character and the object, it becomes possible to realize various processes. For example, it can be considered to be configured to compare influence area information of an object that the character has used in the past with influence area information of an object newly obtained by the character, and cause AI to determine that the newly obtained object is to be treated in the same manner as an object whose influence area information is a high degree of coincidence. Namely, it becomes possible to realize a process to cause AI to guess a method of using the object on the basis of the influence area information.

By applying the guess of this using method, for example, as an application of a process to infer a method of using an unknown object from experience of a known object, various applications can be considered, such as trying to apply ability used with a known object to an unknown object, trying to carry out a technique learned with a sword even for another similar weapon, setting so that large different influence area information cannot be executed even with the same sword category, and allowing a technique based on a weapon to be executed in the similar manner if influence area information is close even though a category as a weapon is another category.

Further, it can be considered that in a case where a mechanism that gives benefits such that treatment becomes better depending upon a length of a use history such as "skill proficiency" for each category of a weapon, or that use of a technique specific to a weapon category is allowed is adopted and it is a similar object whose influence area information is similar, a specification in which at least part of the skill proficiency is applied is adopted even in a case where the category of the weapon is different.

Further, a configuration in which an animation asset when to use the object is dynamically selected by referring to the influence area information of the object newly obtained by the character can be considered. For example, in a case where the area where the body cannot move and the area where the body can move are separately set as the influence area information, by selecting the animation asset on the basis of the influence area information, it becomes possible to dynamically select an animation asset that does not cause breakdown of an animation such as an object sinking into a body of a character.

Further, in a case where it is desired to cause a character controlled by AI to carry out autonomous search behavior and search for a solution to a problem autonomically through trial and error with respect to an object that the AI-controlled character touches, it can be considered to use the influence area information set for the object as a hint to cause the character to carry out the autonomous search behavior.

Further, the influence area information set between the character and the object changes depending upon a size of the character and a size of the object. It is assumed that even with respect to the same object, the content of influence area information set for a very small character is completely different from the content of influence area information set for a giant character. Therefore, it can be considered to determine whether equipment such as a weapon and a protector can be equipped or not on the basis of the influence area information.

Further, in a case where the video game is realized by VR, a position of a hand can be obtained in VR, but a position of an arm cannot be obtained. Therefore, it can be considered that when a virtual object is held in a VR space, the most appropriate arm position is derived from the influence area information set for the object.

Further, it can be considered that in a case where a shape of an item that can be obtained is generated randomly in a survival game, a possibility of a use application is defined dynamically on the basis of the influence area information of the shape that differs each time with respect to how the character can use the obtained item. For example, it can be considered that in a case where a shape of a stone that can be obtained is random, the influence area information is used as a material for making dynamic decisions each time, such as whether it is a stone that can be used as a knife or not, whether it is a stone that can be used as a tool for striking or not, whether it is a stone that can be used as a pedestal or not, and whether it is a stone with a shape, weight, and a size that is easy to throw or not.

Further, it can be considered where should the character hold and use the newly obtained object, that is, to use the influence area information as an element to determine a connection point. A case where a connection point is estimated from distribution of the influence area information can be considered in addition to a case where setting to represent a connection point of an object is executed as the influence area information.

Further, the configuration to determine the degree of similarity of the objects on the basis of the degree of coincidence of the influence area information has been described. However, a configuration may be adopted in which a degree of similarity of objects is comprehensively determined on the basis of a plurality of determination elements including not only the influence area information but also other elements. In that case, it can be considered to adjust an influence of each element on determination of a total degree of similarity of objects by weight.

For example, the total degree of similarity of the objects may be calculated on the basis of three elements including "a degree of similarity of shapes (shapes)", "a degree of similarity of handling (handle)", and "a degree of similarity of influence area information (affordance)". For example, a formula for calculating the degree of similarity at that time becomes the following Formula (1).

$$\text{(Total degree of similarity)} = \{(S^*Sw) + (H^*Hw) + (A^*Aw)\}/(Sw+Hw+Aw) \quad \text{Formula (1)}$$

In Formula (1) described above, "S" is evaluation of a degree of similarity of a shape, "Sw" is weight of the shape, "H" is evaluation of a degree of similarity of handling, "Hw" is weight of handling, "A" is evaluation of a degree of similarity of an affordance, and "Aw" is weight of the affordance. Here, the degree of similarity of the shape is a degree of similarity calculated on the basis of comparison regarding the shapes of the objects. Further, for example, the degree of similarity of the handling is a degree of similarity obtained by evaluating commonality regarding the handling when a character holds and uses an object on the basis of indices such as a distance from the center of the object to a connection position (that is, a handle portion), a distance from the center of the object to the farthest edge of the object, and a handling direction expressed by a directional vector from the center of the object toward the connection position (the handle portion). The degree of similarity of the shape and the degree of similarity of the handling are examples of elements for determining the degree of similarity of the objects, but it can be said that the shape and the handling are important elements as elements when comparing objects. Therefore, by determining the degree of similarity on the basis of these, it can be expected that the determination accuracy of the degree of similarity of the objects is improved.

If only a certain element is focused on in calculation of the degree of similarity of the objects, there is a risk that the determination may be biased due to only one element such that a degree of similarity as a whole is calculated to be low when two objects that seem to have a high degree of similarity are determined by incorporating other elements. However, by calculating the total degree of similarity on the basis of a plurality of elements like Formula (1), it becomes possible to determine the degree of similarity with higher accuracy.

As explained above, as one side of the fifth embodiment, the server 10Z is configured so as to at least include the registering unit 11Z and the outputting unit 12Z. Thus, the registering unit 11Z registers the influence area information in advance, a relationship between a plurality of unit areas around an object when a character is connected to the object and a structural model constituting the character being set for each of the unit areas in the influence area information for each combination of the character and the object; and the outputting unit 12Z outputs, in a case where a certain combination of a character and an object is specified, influence area information corresponding to the certain combination. Therefore, it becomes possible to determine an influence area of an object on a character as a new index indicating characteristics of the object.

Namely, it becomes possible to express the relationship between the character and the object as the influence area information. Therefore, as one of materials for determining a method of using an object newly obtained in AI that controls an NPC or the like, it becomes possible to use the influence area information. Further, for example, by setting an area where a body of a character can move and an area where the body of the character cannot move as the influence area information, when AI uses an object newly obtained, an effect that an animation does not break when trying to move a body of a character toward an area where the body cannot move can be obtained.

Further, as one side of the fifth embodiment, the server 10Z is configured so as to at least include the registering unit 11Z, the outputting unit 12Z, and the first comparing unit 13Z. Thus, the first comparing unit 13Z compares the influence area information for the combination of the character and the object with the influence area information for the combination of the character and the at least one other object to output the first comparison result. Therefore, it becomes possible to compare influence area information of an object as a comparison source regarding a combination with the same character with influence area information of at least one object as a comparison target.

Namely, by using the first comparison result of the influence area information, for example, it becomes possible to calculate and use a degree of similarity of objects from a degree of coincidence of influence area information.

Further, as one side of the fifth embodiment, the server 10Z is configured so as to at least include the registering unit 11Z, the outputting unit 12Z, and the second comparing unit 14Z. Thus, the second comparing unit 14Z compares the influence area information for the combination of the character and the object with the influence area information for the combination of the object and the at least one other character to output the second comparison result. Therefore, it becomes possible to compare influence area information of at least one character as a comparison target with influence area information of a character regarding a combination with the same object as a comparison target.

Namely, by using the second comparison result of the influence area information, for example, it becomes possible to execute a process based on a difference of bodies of characters with respect to the same object.

As explained above, one shortage or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, and 201 to 20N and the server 10 executes the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following disclosures can be at least performed by a person having a normal skill in the art to which the present disclosure belongs.

(1)

A non-transitory computer-readable medium including a video game processing program for causing a server to perform functions to determine an influence area of an object on a character, the functions comprising:
- a registering function configured to register influence area information in advance, a relationship between a plurality of unit areas around an object when a character is connected to the object and a structural model constituting the character being set for each of the unit areas in the influence area information for each combination of the character and the object; and
- an outputting function configured to output, in a case where a certain combination of a character and an object is specified, influence area information corresponding to the certain combination.

(2)

The non-transitory computer-readable medium according to (1), the functions further comprising:
- a first comparing function configured to compare the influence area information for the combination of the character and the object with influence area information for a combination of the character and at least one other object to output a first comparison result.

(3)

The non-transitory computer-readable medium according to (1) or (2), the functions further comprising:
- a second comparing function configured to compare the influence area information for the combination of the character and the object with influence area information for a combination of the object and at least one other character to output a second comparison result.

(4)

The non-transitory computer-readable medium according to any one of (1) to (3),
wherein the registering function is configured to register, in a case where a plurality of methods of connecting the character to the object, the influence area information for each connecting method in advance.

(5)

The non-transitory computer-readable medium according to (2),
wherein at least one use application is set to the object as an action, and an action regarding the object of the character is selected on a basis of a predetermined selection standard,
wherein the functions further comprise:
- an extracting function configured to extract a similar object similar to an object newly obtained as a new object by the character from one or more objects whose selection standards have already been stored by the character as selection standard stored objects; and
- an inheriting function configured to set, at least for actions set in common between the similar object and the new object, a selection probability of each action in a selection standard stored so as to be associated with the new object on a basis of a selection probability of each action in a selection standard stored so as to be associated with the similar object, and
wherein the extracting function is configured to extract the similar object by comparing the new object with each of the selection standard stored objects on a basis of the first comparing function.

(6)

A non-transitory computer-readable medium including a video game processing program for causing a user terminal to perform at least one function of the functions that the video game processing program described in any one of (1) to (5) causes the server to perform, the user terminal being capable of communicating with the server.

(7)

A video game processing system for executing processes to determine an influence area of an object on a character, the video game processing system comprising a communication network, a server, and a user terminal, the video game processing system further comprising:
- a registerer configured to register influence area information in advance, a relationship between a plurality of unit areas around an object when a character is connected to the object and a structural model constituting the character being set for each of the unit areas in the influence area information for each combination of the character and the object; and
- an output controller configured to output, in a case where a certain combination of a character and an object is specified, influence area information corresponding to the certain combination.

(8)

The video game processing system according to (7),
wherein the server includes the registerer and the output controller, and
wherein the user terminal includes a display output controller configured to output a game screen to a display screen of a display device, the game screen representing a result indicated by the influence area information outputted by the outputter.

(9)

A non-transitory computer-readable medium including a video game processing program for causing a user terminal to perform functions to determine an influence area of an object on a character, the functions comprising:

a registering function configured to register influence area information in advance, a relationship between a plurality of unit areas around an object when a character is connected to the object and a structural model constituting the character being set for each of the unit areas in the influence area information for each combination of the character and the object; and an outputting function configured to output, in a case where a certain combination of a character and an object is specified, influence area information corresponding to the certain combination.

(10)

A video game processing method of executing processes to determine an influence area of an object on a character, the video game processing method comprising:

a registering process configured to register influence area information in advance, a relationship between a plurality of unit areas around an object when a character is connected to the object and a structural model constituting the character being set for each of the unit areas in the influence area information for each combination of the character and the object; and an outputting process configured to output, in a case where a certain combination of a character and an object is specified, influence area information corresponding to the certain combination.

(11)

A video game processing method of executing processes to determine an influence area of an object on a character by a video game processing system, the video game processing system comprising a communication network, a server, and the user terminal, the video game processing method comprising:

a registering process configured to register influence area information in advance, a relationship between a plurality of unit areas around an object when a character is connected to the object and a structural model constituting the character being set for each of the unit areas in the influence area information for each combination of the character and the object; and an outputting process configured to output, in a case where a certain combination of a character and an object is specified, influence area information corresponding to the certain combination.

INDUSTRIAL APPLICABILITY

According to one of the embodiments of the present disclosure, setting influence area information as an affordance for each combination of a character and an object is useful to realize a new autonomous search behavior, which could not be realized in the past, for AI that controls a character on the basis of a "visualized" affordance or AI (meta AI) that controls game environment.

What is claimed is:

1. A non-transitory computer-readable medium storing a video game processing program for causing a server to perform functions comprising:

registering influence area information for each combination of a character and an object in advance, a relationship between each unit area of a plurality of unit areas around the object when the character is connected to the object and a structural model configuring the character;

if a combination of a character and an object is specified, outputting the influence area information corresponding to the combination of the character and the object; and comparing the influence area information for the combination of the character and the object with influence area information for a combination of the character and at least one other object to output an object comparison result, wherein at least one action is set to the object that is a first object, and an action regarding the first object of the character is selected based on a predetermined selection standard;

extracting a similar object from one or more objects whose selection standards have already been stored by the character, the similar object being similar to a new object newly obtained by the character, wherein the extracting comprises extracting the similar object by comparing the new object with each object of the selection standard stored objects based on the object comparison result; and setting, at least for one or more actions commonly set between the similar object and the new object, a selection probability of each action under a selection standard stored in association with the new object based on a selection probability of each action under a selection standard stored in association with the similar object.

2. The non-transitory computer-readable medium according to claim 1, the functions further comprising:

comparing the influence area information for the combination of the character and the object with influence area information for a combination of the object and at least one other character to output a character comparison result.

3. The non-transitory computer-readable medium according to claim 1, wherein the registering comprises registering the influence area information for each method among a plurality of methods of connecting the character to the object in advance.

4. A video game processing system comprising:
a communication network;
a server;
a user terminal; and
one or more processors configured to:
register influence area information for each combination of a character and an object in advance, the influence area information including a relationship between each unit area of a plurality of unit areas around the object when the character is connected to the object and a structural model configuring the character;

if a combination of a character and an object is specified, output the influence area information corresponding to the combination of the character and the object;
compare the influence area information for the combination of the character and the object with influence area information for a combination of the character and at least one other object to output an object comparison result, wherein at least one action is set to the object that is a first object, and an action regarding the first object of the character is selected based on a predetermined selection standard;
extract a similar object from one or more objects whose selection standards have already been stored by the character, the similar object being similar to a new object newly obtained by the character, wherein the one or more processors are configured to compare the new object with each object of the selection standard stored objects based on the object comparison in order to extract the similar object by result; and
set, at least for one or more actions commonly set between the similar object and the new object, a selection probability of each action under a selection standard stored in association with the new object based on a selection probability of each action under a selection standard stored in association with the similar object.

5. A non-transitory computer-readable medium storing a video game processing program for causing a user terminal to perform functions comprising:
registering influence area information for each combination of a character and an object in advance, the influence area information including a relationship between each unit area of a plurality of unit areas around the object when the character is connected to the object and a structural model configuring the character;
if a combination of a character and an object is specified, outputting the influence area information corresponding to the combination of the character and the object; and
comparing the influence area information for the combination of the character and the object with influence area information for a combination of the character and at least one other object to output an object comparison result, wherein at least one action is set to the object that is a first object, and an action regarding the first object of the character is selected based on a predetermined selection standard;
extracting a similar object from one or more objects whose selection standards have already been stored by the character, the similar object being similar to a new object newly obtained by the character, wherein the extracting comprises extracting the similar object by comparing the new object with each object of the selection standard stored objects based on the object comparison result; and
setting, at least for one or more actions commonly set between the similar object and the new object, a selection probability of each action under a selection standard stored in association with the new object based on a selection probability of each action under a selection standard stored in association with the similar object.

* * * * *